Patented June 1, 1954

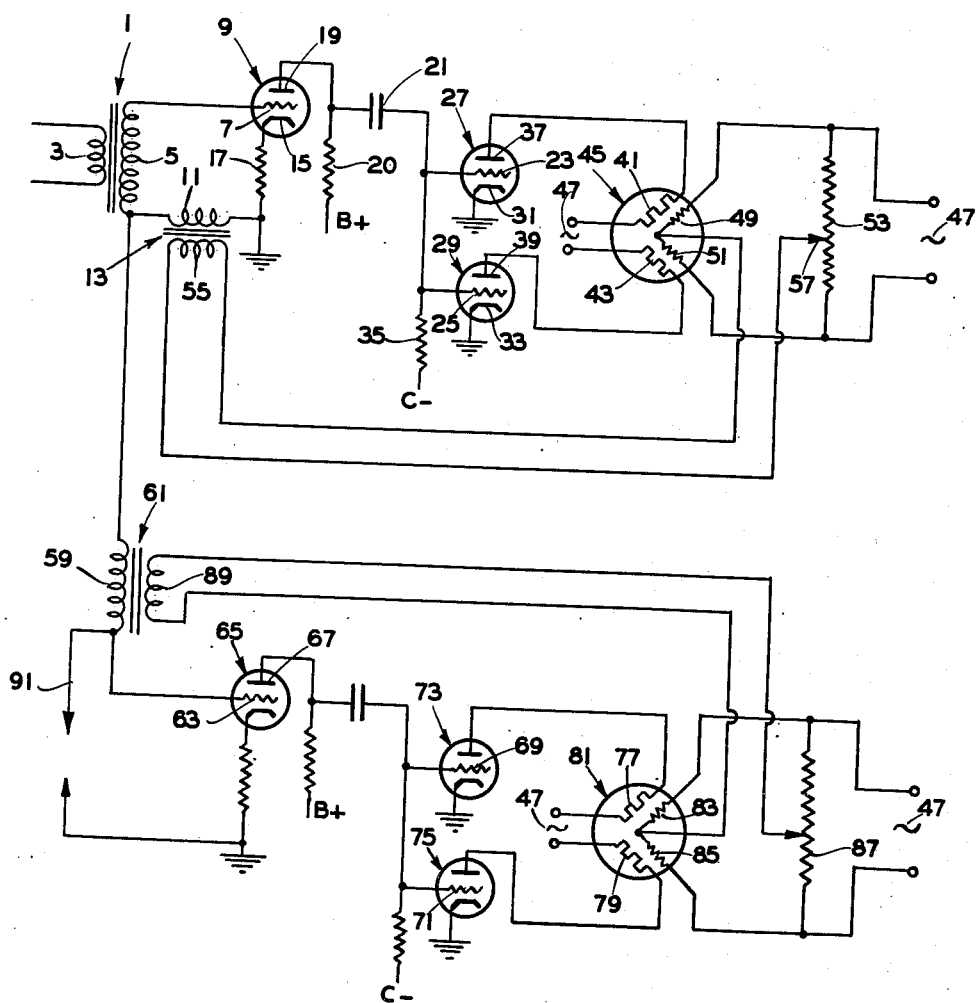

2,680,193

UNITED STATES PATENT OFFICE 2,680,193

DATA SMOOTHER

Paul A. Noxon, Tenafly, N. J., and Alfred Bennett, New York, N. Y., assignors to Bendix Aviation Corporation, Teterboro, N. J., a corporation of Delaware Application June 17, 1950, Serial No. 168,776

12 Claims. (Cl. 250—27)

The invention relates to data smoothing circuits, and more particularly to data smoothing circuits responsive to relatively low frequencies.

Radio beams of the kind commonly used to guide an airplane automatically along a predetermined flight path usually include spurious information comprising undesirable voltages of relatively high frequencies, such as noise and side bands generated in the ground transmitter. Also, the beam has undesirable curves or bends because of reflection of the beam from terrestrial objects or from aircraft flying in the vicinity of the beam. An airplane, automatically guided by an automatic pilot responsive to the radio beam, responds to this spurious information and flies erratically. When the aircraft is cruising in response to the radio beam control, the beam signal must be applied to the automatic pilot as smoothly as possible to provide a comfortable ride.

One object of the present invention is to eliminate the effects of the spurious information on the automatic pilot.

Another object is to smooth out minor variations in signal voltages without materially affecting the accuracy of the data represented thereby.

A further object is to provide a data smoothing circuit which is stable.

Another object is to provide a filter which passes signals of relatively low frequencies with relatively small attenuation and effectively rejects signals of higher frequencies.

A further object is to provide an average signal by integrating the signal voltage with a relatively long time constant so that the effects of transients are eliminated.

Another object is to provide a smooth output voltage which does not have an undesirable time lag relative to the signal voltage.

The invention contemplates a data smoothing circuit for receiving a variable signal comprising a plurality of frequency components. The device has a filter network with a relatively long time constant to integrate the signal. The integrated output voltage of the filter lags behind the signal as determined by the time constant of the filter circuit. At relatively high frequencies, the actual time lag may be only a few thousandths of a second but at the low frequencies contemplated by the present invention the delay may amount to several seconds. In fast flying aircraft, this slow response is undesirable. For this reason, the integrated output of the filter is fed to a phase advancing network or rate circuit and the constants of the rate circuit may be selected so that the resulting voltage is in phase with the original signal or leads the original signal. The output of the rate circuit may be fed to a servo system and no undesirable delay in the response of the servo system will be encountered.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description only, and is not to be construed as defining the limits of the invention.

In the drawing, the single figure is a wiring diagram of a novel data smoothing circuit constructed according to the invention.

Referring now to the drawing for a more detailed description of the present invention, the novel data smoothing circuit is shown as including a filter network having an input transformer 1 with a primary winding 3 adapted to receive a signal from a suitable source and with a secondary winding 5 connected to a grid 7 of a high gain amplifier tube 9 and connected in series with the secondary 11 of a feed-back transformer 13 to ground. Cathode 15 of tube 9 is connected to ground through a cathode resistor 17.

Plate 19 of tube 9 is connected through a resistor 20 to a B+ supply and through a condenser 21 to the grids 23, 25 of a pair of discriminator tubes 27, 29, respectively. Grids 23, 25 are connected to a negative C bias through a grid leak resistor 35. Cathodes 31, 33 of tubes 27, 29, respectively, are grounded.

Plates 37, 39 of tubes 27, 29 are connected to heater elements 41, 43, respectively, of a thermal time delay tube 45 of the kind shown and described in U. S. Patent No. 2,463,805, issued March 8, 1949 and assigned to a common assignee. The heaters are connected to a suitable source of alternating current supply 47 in phase with the modulated signal frequency. The time delay tube includes a pair of resistors 49, 51 in heat exchange relation with heaters 41, 43, respectively, and forming two adjoining arms of a Wheatstone bridge circuit. The other two arms of the bridge circuit are formed by a center-tapped resistor 53 connected across alternating power source 47. The primary winding 55 of feed-back transformer 13 is connected across the bridge circuit to the center tap 57 of resistor 53 and between resistors 49, 51.

The arrangement above described corresponds generally to the circuit shown and described in co-pending application Serial No. 90,236, filed April 20, 1949 and assigned to a common assignee.

The time delay tube may have any desired time constant to filter out undesirable voltages of predetermined frequencies. In one arrangement, the time delay tube has a time constant of two minutes and the circuit effectively attenuates signals having frequencies above six cycles per minute. As mentioned above, such a delay between the integrated output of the filter circuit and the input signal is undesirable when the control device is used to operate an automatic pilot in an aircraft.

For this reason, the integrated signal across feed-back transformer secondary 11 is impressed on a phase advancing network or rate circuit, described below and closely resembling the filter network to provide a resulting signal corresponding to the integrated output of the filter and in phase with or leading the original signal as determined by the time constant of the rate circuit.

Secondary winding 59 of a feed-back transformer 61 has one end connected between secondary windings 5 and 11 of transformers 1 and 13 and has its other end connected to a grid 63 of a high gain amplifier tube 65. Plate 67 of tube 65 is connected to grids 69, 71 of a pair of discriminator tubes 73, 75 and the plates of the discriminator tubes are connected to heaters 77, 79 of time delay tube 81. The output of tube 81, as determined by unbalance of the associated bridge circuit including resistors 83, 85 of tube 81 and center-tapped resistor 87, is impressed on the primary 89 of feed-back transformer 61. The end of feed-back secondary 59 adjacent grid 63 may be connected by a lead 91 to a rudder channel amplifier and an aileron channel amplifier as described in the above co-pending application Serial No. 90,236, and provides a resulting signal in phase with or leading the original signal fed to transformer 1. The time constant of the second time delay circuit preferably is greater than the time constant for the first time delay circuit so that even at such low frequencies as one cycle in five minutes the resulting signal will lead the original signal.

When the device is used with an automatic pilot to guide an airplane automatically along a predetermined flight path, the modulated signal from a cross pointer meter may be used to energize winding 3 of transformer 1, but it should be understood that any amplitude modulated signal developed as a result of a variable condition or function being considered may be used. The data smoothing circuit will respond to variable D. C. signals as well as amplitude modulated signals by substituting in place of transformer 1 suitable D. C. components, such as a magnetic amplifier of the kind described in co-pending application Serial No. 165,508, filed June 1, 1950 and assigned to a common assignee.

The input signal is amplified by amplifier tube 9 and discriminated against by discriminator tubes 27, 29 and one or the other of the heaters 41, 43 of time delay tube 45 is heated as determined by the phase of the signal relative to the discriminator plate supply. The grids of the discriminator tubes preferably are biased so that the heater elements for zero signal input are heated continuously at the midpoint of the useful range. More current flows in one heater element than in the other, and the bridge is unbalanced and a voltage is fed back to transformer 13. The integrated voltage across secondary winding 11 of transformer 13 lags behind the signal impressed on transformer 1, but has undesirable frequencies and irregularities removed therefrom. The integrated voltage is amplified by tube 65 and is discriminated against by discriminator tubes 73, 75, and the output of the discriminator is impressed on heaters 77, 79 of time delay tube 81. The output of tube 81, as determined by unbalance of the associated bridge circuit, is impressed on feed-back transformer 61. The resulting voltage appearing on grid 63 of amplifier tube 65 is the difference between the integrated voltage and the feed-back voltage across transformer 61 and is a rate signal in phase with or leading the original signal. The resulting voltage may be applied through lead 91 to a servo system or other apparatus responsive thereto as shown and described in application Serial No. 90,236.

The data smoothing circuit includes a filter which passes signals of relatively low frequencies with relatively small attenuation and effectively rejects signals of higher frequencies. The time lag of the first time delay circuit, which normally attenuates frequencies above six cycles per minute, is effectively changed to a lead angle by the phase advancing network.

Although the data smoothing circuit herein described is applied specifically to control of aircraft by a radio beam, it should be understood that the circuit may be applied to any servo system which requires a smooth signal in phase with or leading the original signal, and this is readily accomplished by selecting suitable time constants for the two time delay circuits to filter undesirable frequencies and provide the necessary phase advance.

The data smoothing circuit described is especially adapted for passing frequencies below three or four cycles per minute and for rejecting higher frequencies, but as mentioned above, by selecting different time constants, other frequencies can be made critical. Spurious information is rejected and minor variations in the signal voltage are smoothed out without materially affecting the accuracy of the data represented by the signal voltage. The circuit provides an average signal by integrating the signal voltage so that the effects of transients are eliminated and the signal has a practical degree of smoothness.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A data smoothing circuit adapted to receive a variable signal, comprising a filter network having a predetermined time constant for integrating the signal, and a phase advancing network connected to the filter network and receiving the integrated signal for having a time constant longer than said first-mentioned time constant for advancing the phase of the integrated signal and an output connected to said phase advancing network for utilizing the phase advanced integrated signal.

2. A data smoothing circuit adapted to receive a variable signal and comprising a filter network having a thermal time delay device with a relatively long time constant for integrating the signal, and a phase advancing network connected to the filter network and receiving the integrated signal and having a thermal time delay device with a time constant longer than the time constant of the first-mentioned thermal time delay device for advancing the phase of the integrated signal and an output connected to said phase advancing network for utilizing the phase advanced integrated signal.

3. A data smoothing circuit adapted to receive a variable signal and comprising a filter network for integrating the signal, and a phase advancing network connected to the filter network and receiving the integrated signal and advancing its phase, each of said networks including an input, a time delay device, and feed-back means connecting the time delay device to the input of the associated network.

4. Structure as described in claim 3 in which the time delay device of the phase advancing network has a time constant longer than the time constant of the integrating network so that the phase advanced integrated signal leads the variable signal.

5. In a device of the kind described for receiving a variable signal, a first time delay circuit having a feed-back means for integrating the signal, a second time delay circuit connected to said first time delay circuit and having feed-back means, said second time delay circuit receiving the integrated signal and taking the voltage difference between the integrated voltage and the feed-back voltage of the second time delay circuit to provide a resulting signal substantially in phase with the variable signal.

6. In a device of the kind described having an input for receiving a variable signal comprising a pair of components of different frequencies, first time delay means connected to said input and responsive to only one of said components, feed-back means connecting said time delay means and said input for cancelling said one component at said input and providing an integrated signal, second time delay means having an input connected to said feed-back means for receiving the integrated signal, and feed-back means connecting said second time delay means and said last-mentioned input to provide a resulting signal substantially in phase with the variable signal.

7. In a device of the kind described having an input for receiving a variable signal comprising a pair of components of different frequencies, first means comprising a thermal time delay device connected to said input and having a predetermined time constant so as to respond to only one of said components, feed-back means connecting said device and said input for cancelling said one component at said input and providing an integrated signal, second means having a second input connected to said feed-back means for receiving the integrated signal and comprising a second thermal time delay device associated with said second input, second feed-back means connecting said second time delay device and said second input for providing a resulting signal, said second time delay device having a predetermined time constant so that the resulting signal is in phase with or leads the variable signal.

8. A device of the kind described including a low pass filter having an input for receiving a variable signal comprising at least two components of different frequencies, means including a thermal time delay device associated with said input and having a predetermined time constant so as to respond to only the lower frequency component and be unresponsive to the higher frequency component to integrate the variable signal, means connecting said time delay device and said input for cancelling said lower frequency component at said input, means having a second input connected to said connecting means and including a second thermal time delay device associated with said second input, means connecting said second time delay device and said second input for providing a resulting signal in phase with, or leading the variable signal.

9. A device of the kind described including a low pass filter having an input for receiving a variable signal comprising a pair of components of different frequencies, an amplifier connected to said input for receiving said components, means comprising a time delay device connected to said amplifier and having a predetermined time constant so as to respond to only the lower frequency component to provide an integrated signal, feed-back means connecting said input and said time delay device for cancelling said lower frequency component, means having a second input connected to said feed-back means for receiving the integrated signal and including a second amplifier connected to said second input, a second time delay device connected to said second amplifier, second feed-back means connecting said second input and said second time delay device for providing a resulting signal, said second time delay device having a predetermined time constant so that the resulting signal is in phase with, or leads the variable signal.

10. A data smoothing circuit adapted to receive a variable signal and comprising a source of reference voltage, a filter network operatively connected with said voltage source for integrating the signal and including a discriminator for comparing the signal with said reference voltage to detect the phase of the signal, and a phase advancing network connected to the filter network and receiving the integrated signal and advancing its phase.

11. A data smoothing circuit adapted to receive a variable signal and comprising a source of reference voltage, a filter network for integrating the signal, and a phase advancing network operatively connected to said filter network and said voltage source for receiving the integrated signal and advancing its phase and including a discriminator for comparing the signal with said reference voltage to detect the phase of the integrated signal.

12. A data smoothing circuit adapted to receive a variable signal and comprising a filter network for integrating the signal and including a discriminator to detect the phase of the signal, a source of reference voltage, and a phase advancing network operatively connected to said filter network and said voltage source for receiving the integrated signal and advancing its phase and including a discriminator for comparing the signal with said reference voltage to detect the phase of the integrated signal.

References Cited in the file of this patent

UNITED STATES PATENTS

| Number | Name | Date |
|---|---|---|
| 1,315,539 | Carson | Sept. 9, 1919 |
| 1,872,560 | Breisky | Aug. 16, 1932 |
| 2,025,775 | Rieber | Dec. 31, 1935 |
| 2,251,973 | Beale et al. | Aug. 12, 1941 |
| 2,346,838 | Haight | Apr. 18, 1944 |
| 2,441,030 | Page | May 4, 1948 |
| 2,533,587 | Kittredge | Dec. 12, 1950 |

FOREIGN PATENTS

| Number | Country | Date |
|---|---|---|
| 366,920 | Great Britain | Feb. 8, 1932 |